(12) United States Patent
von der Hardt et al.

(10) Patent No.: US 6,372,133 B1
(45) Date of Patent: Apr. 16, 2002

(54) MULTIPLE FILTER HOUSING WITH FILTER ELEMENT LOCKING DEVICE

(75) Inventors: Jochen von der Hardt; Ulrich Quaschning; Maik Jornitz, all of Göttingen (DE)

(73) Assignee: Sartorius AG (DE)

( * ) Notice: Subject to any disclaimer, the term of this patent is extended or adjusted under 35 U.S.C. 154(b) by 0 days.

(21) Appl. No.: 09/675,575

(22) Filed: Sep. 29, 2000

Related U.S. Application Data

(63) Continuation of application No. PCT/EP99/04216, filed on Jun. 17, 1999.

(30) Foreign Application Priority Data

Jun. 27, 1998 (DE) .......................................... 198 28 840

(51) Int. Cl.⁷ ........................... B01D 27/08; B01D 27/14
(52) U.S. Cl. ..................... 210/232; 210/323.2; 210/443
(58) Field of Search .............................. 210/232, 323.2, 210/435, 443

(56) References Cited

U.S. PATENT DOCUMENTS 5,770,066 A  6/1998  Coates ........................ 210/232

FOREIGN PATENT DOCUMENTS

DE  2118405  10/1972  ........... B01D/29/10

OTHER PUBLICATIONS

Pall Housing Data Sheet H25, Feb. 1987, Selection Guide Sane 2 Style Filter Housings, 2 Pages.*
Pall Housing Data Sheet H21, Feb. 1987, Selection Guide Sanlil Style Filter Housings, 2 Pages.*

* cited by examiner

*Primary Examiner*—Robert J. Popovics
(74) *Attorney, Agent, or Firm*—Chernoff, Vilhauer, McClung & Stenzel, LLP

(57) ABSTRACT

A multiple fluid filter apparatus is disclosed having a locking arrangement for securing multiple filter elements that accommodates different size filters, permits axial expansion and contraction of the filters, yet prevents warping.

10 Claims, 2 Drawing Sheets

MULTIPLE FILTER HOUSING WITH FILTER ELEMENT LOCKING DEVICE

This application is a continuation of PCT/EP99/04216 filed on Jun. 17, 1999.

BACKGROUND OF THE INVENTION

Filter housings equipped with several filter elements such as filter cartridges or wound modules are used, for example, for pressure filtration of fluids such as liquids and gases for separation of undesirable components such as heavy metal ions, microorganisms from waste water or beverages, for the concentration of proteins, for sterile filtration in the pharmaceutical industry, and so forth. Such filter elements are subjected to mechanical loads during both filtration and filter cleaning. The bending or warping of plastic filter elements in their longitudinal axis has a particularly serious effect in that it results in damage to the filter elements, including the filter materials, rendering them unusable. Such warping is caused primarily by flow turbulence, by pressure surges, and by backflushing.

Attempts to prevent such warping of the filter elements by means of locking devices is known. For example, Soviet Union Patent No. 17 54 157 Al discloses a multiple filter housing with several filter elements that are accommodated on the permeate side by a base plate. Above the filter elements on the feed side there is a plate-shaped contact pressure device through which adjusting screws are inserted to the end caps of the filter elements in order to lock them in place. The plate-shaped contact pressure device is attached to a central spacer rod. With this locking device, differences in the overall heights of the filter elements can also be accommodated on an individual basis by the adjusting screws. However, a major drawback to such an arrangement is that the filter elements cannot expand along their length at varying elevated temperatures such as are encountered with inline superheated steam sterilization, which can still lead to warping damage of the filter elements. Other drawbacks of this arrangement are that the locking device consists of many components, which makes assembly and disassembly of the filtering apparatus very time-consuming, and that the multiple components have numerous edges and cavities that are difficult to clean. Moreover, such a design does not comply with generally accepted regulations of the U.S. Food and Drug Administration (FDA), does not comply with FDA Good Manufacturing Practices and generally does not provide a satisfactory technical solution.

It is therefore a principal object of the invention to provide a multiple filter apparatus with a locking device for filter elements from a minimal number of components whereby bending or warping of the filter elements is prevented, differences in the length of the filter elements caused by manufacturing tolerances are tolerated, and thermal expansion and contraction of the filter elements is permitted. Another object of the invention is to provide a multiple filter apparatus with a locking device that is simply constructed and easy to lock, and that has a minimal number of parts that are difficult to clean.

These objects and others which will become apparent to one of ordinary skill in the art are provided by the present invention, which is summarized and described in detail below.

BRIEF SUMMARY OF THE INVENTION

The invention comprises a multiple filter housing consisting of a housing dome and a housing base with a base plate, the housing being equipped with a locking device consisting of a spacer rod and a centering plate. The housing is provided with connections for the feed and discharge of fluids and accepts a number of cartridge-type filter elements, such as filter cartridges or spiral wound modules, that are accommodated and affixed to the base plate in conventional fashion so as to divide the feed and permeate zones, whereby the fluid to be filtered proceeds from one zone to the other only through the filter material of the filter elements by the application of a pressure difference between the feed and permeate zones. The filter elements have guide adapters on their ends distal to the base plate which have a smaller diameter than the overall diameter of the filter elements themselves and that usually taper at the top. The multiple filter housing can be operated in any position, but is preferably operated so that the filter elements stand upright, i.e., the guide adapters point upward.

DETAILED DESCRIPTION OF PREFERRED EMBODIMENTS

Figure 1:
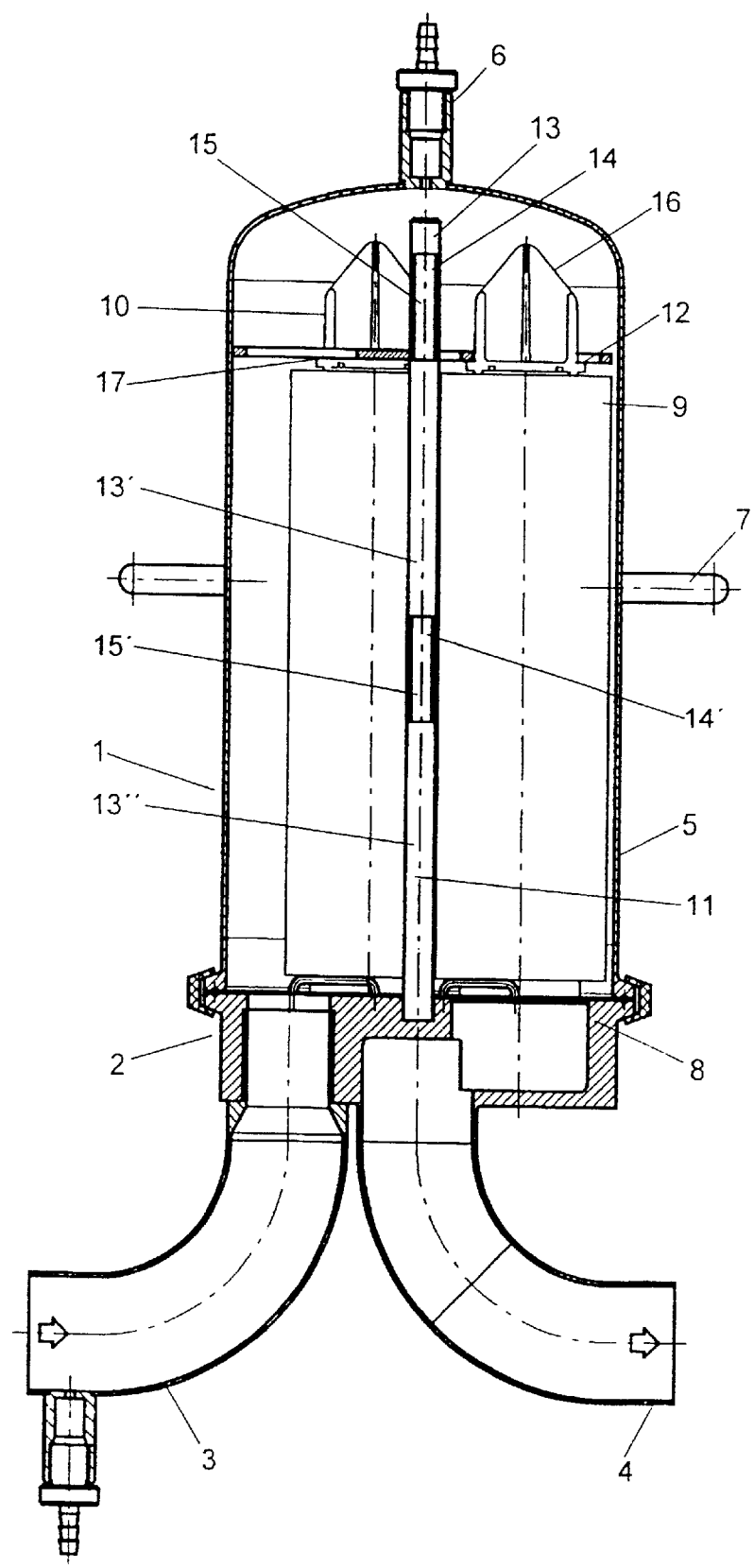
FIG. 1 is a vertical section through an exemplary embodiment of a multiple filter housing according to the invention.

Referring to the drawings, wherein the same numerical references refer to the same elements, there is shown in FIG. 1 a multiple filter apparatus comprising a housing 1, the housing consisting of a housing base 2 having feed inlet 3 and filtrate outlet 4, a housing dome 5 with a vent 6 and optional handle 7. Base plate 8 is shown accommodating a plurality of cartridge-type filter elements 9 of a single model size which are provided with guide adapters 10 that have tapered segments 16. The locking device consists of a spacer rod 11 and a centering plate 12. Centering plate 12 accepts either the filter elements 9 or the guide adapters 10. Spacer rod 11 is attached at its end perpendicular to housing base 2 or base plate 5 and lies on the median axis of multiple filter housing 1. Spacer rod 11 has three distinct segments 13, 13' and 13" and two locking profiles 15 and 15' in the sections 14 and 14', respectively: in the embodiment of the invention shown, the area of the first end segment 13 of spacer rod 11 begins above guide adapter 10 and ends above the tapering segment 16 of the guide adapter, while the lower border of section 14 with locking profile 15 is positioned at the height of the guide profile 17 of the guide adapter. The free end of the spacer rod 11 is inserted through the locking opening 18 of centering plate 12. Centering plate 12 rests on a lower stop of section 14 of the spacer rod, or on the guide profile 17 of the guide adapter, whichever has the greatest overall height. Centering plate 12 is initially movable radially around and axially along spacer rod 11 as it is mounted in the area of the first end segment 13 and, in the area of section 14 with locking profile 15 in locked position, is only movable axially along spacer rod 11. Shorter filter elements may be secured by a centering plate locked on locking profile 15'.

Figure 2:
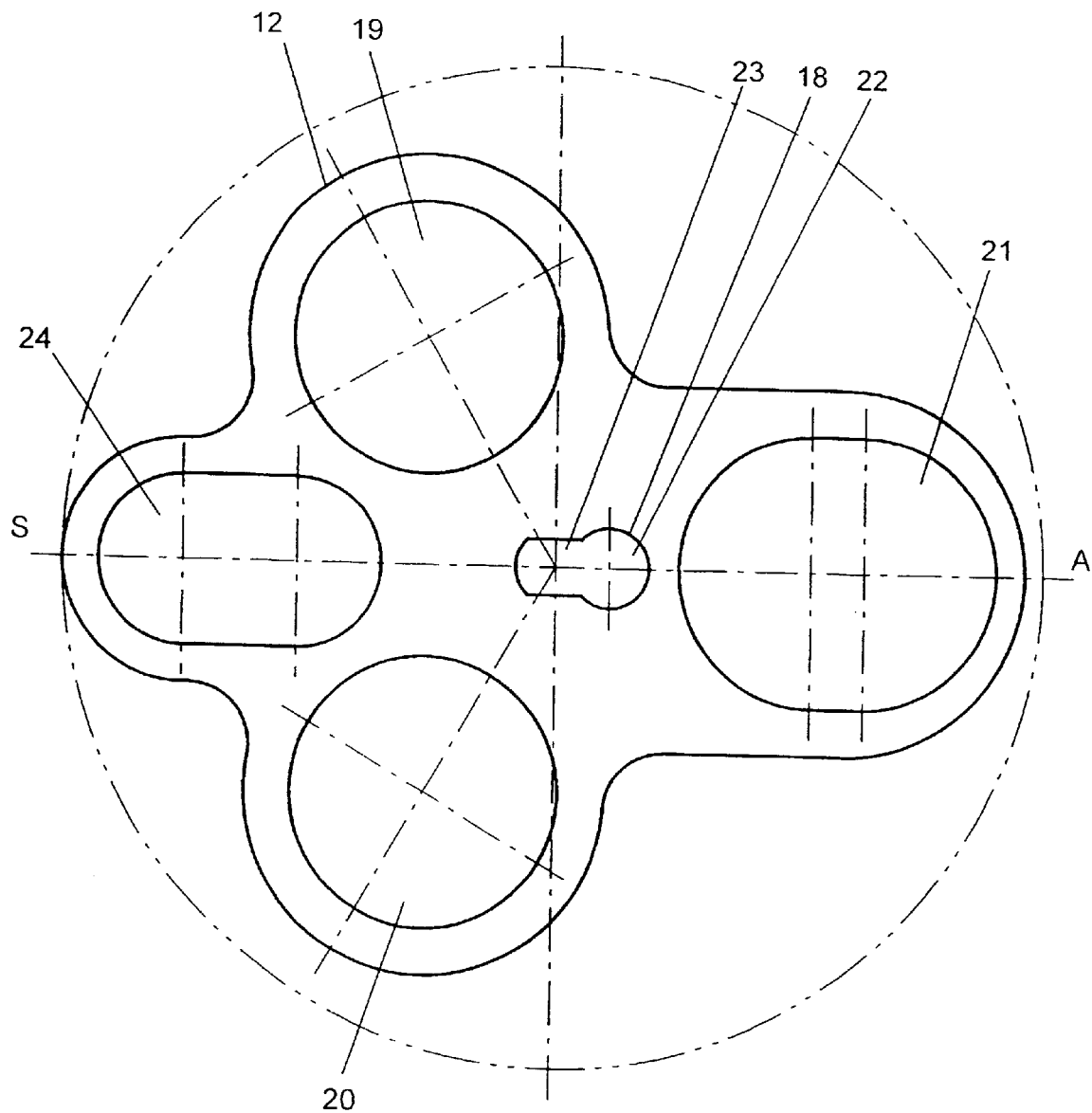
FIG. 2 is a plan view of an exemplary centering plate according to the invention.

As shown in FIG. 2, centering plate 12 has openings 19, 20, and 21 to accept guide adapters 10. Opening 21 is shown as an oblong hole to facilitate locking and unlocking. Locking opening 18 is keyhole-shaped, formed of a circular aperture 22 with a notch 23 having a smaller width than the diameter of the circular aperture 22. The center of the notch 23 coincides with the center of centering plate 12, whose outermost peripheral regions lie on a circular arc that is slightly smaller than the internal circumference of the multiple filter housing. Circular aperture 22 of locking opening 18 serves to guide spacer rod 11 through locking opening 18 when centering plate 12 captures guide adapters 10 with openings 19, 20 and 21 by turning and lowering the centering plate 12, and, after the area 14 of the spacer rod has been reached, to move the centering plate 12 with its notch 23 over the locking profile 15 of spacer rod 11, thereby achieving locking. Centering plate 12 is also equipped with another opening 24 formed as an oblong hole, which is in contact at its outer periphery with the closed housing dome 5 and assures locking. In the embodiment of the centering plate 12 shown, openings 21 and 24 and locking opening 18 are aligned along an axis S-A, which forms an axis of symmetry of centering plate 12. This construction, which is asymmetric with respect to every other axis, assures the correct and secure installation of the centering plate 12, even by personnel with little experience.

As mentioned, centering plate 12 of the locking device has a locking opening 18 and openings to accommodate either the filter elements 9 or the guide adapters 10 of the filter elements. Spacer rod 11 is perpendicular to and rigidly attached to housing base 2. It has a locking profile 15 in at least one area 14 of a first segment 13 and another locking profile 15' in at a least one area 14' of a second segment 13'. In a preferred embodiment of the invention, the at least one area of the first segment 13 is the end segment of the free end of spacer rod 11 and begins above guide adapters 10 and ends within the upper half, preferably within the upper third, of filter elements 9 or, in an alternative embodiment, within the tapered segment 16 of guide adapters 10. The at least one area of the second segment 13' of spacer rod 11 with locking profile 15' reaches halfway up the length of the rod at the most, preferably as high as the end of the upper third of filter elements 9. In an alternative embodiment, the lower terminus of the segment 13 with the locking profile 15 is positioned at least at the height of the guide profile 17 of the filter element guide adapters 10.

In the case of two centering plates, spacer rod 11 penetrates locking opening 18 of each centering plate 12 with its free end in such a way that the centering plates are radially movable around spacer rod 11 in the area of the first segment 13 and in the area of the second segment 13', but with the respective locking profiles in locking position, the centering plates are only movable axially along spacer rod 11. During assembly, a given centering plate 12 with its locking opening 18 is slid to the first segment 13 of spacer rod 11 and turned radially until its openings 19, 20 and 21 can accept the guide adapters 10. It is then lowered in the axial direction and locked with the locking profile of the spacer rod. In locking position, an orthogonal adjustment of filter elements 9 in relation to base plate 8 is ensured, so that housing dome 5 can be readily mounted and secured to housing base 2.

Locking profiles 15 and 15' of centering plate 12 preferably have a key-shaped cross section to mate with locking opening 18, comprising a generally circular portion and a generally rectangular portion with the rectangular or notch portion having a width less than the diameter of the circular portion. To achieve locking, spacer rod 11 is pressed in the direction of this notch in such a way that the locking profile 15, 15' of spacer rod 11 positively penetrates the notch. The notch portion is preferably in the shape of three sides of a rectangle, preferably with rounded corners. If spacer rod 11 extends along the median axis of the multiple filter housing, it is advantageous that if the center of the notch lies on this axis and the center coincides with the center of a circle beyond which the periphery of centering plate 12 does not extend. The center of the notch thus coincides with the center of a circle (shown in dashed line in FIG. 2) that is slightly smaller than the circumference of the internal wall of the multiple filter housing. Otherwise, housing dome 5 is not attachable or centering plate 12 will at least not be horizontally mountable in the multiple filter housing. As displacement of centering plate 12 is only possible in the axial direction, filter elements 9 can only expand axially, and are not permitted to warp. If centering plate 12 only accommodates guide adapters 10 of filter elements 9 in the alternative embodiment, then centering plate 12 will simply be displaced upward by the filter elements expanding axially. In this alternative embodiment, because the lower terminus of the segment 13 with the locking profile 15 of the spacer rod 11 is positioned at the height of the guide profile 17 of the guide adapter 10 of the filter element with the largest overall height, the length of the second segment 13' with the locking profile 15' of spacer rod 11 is shorter than the height of the guide adapter 10 of the filter elements, and the diameter of the openings of the centering plate 12 for accepting the guide adapters of the filter elements is larger than the diameter of the guide adapters, but smaller than the diameter of the filter elements. Because of this, variance in overall height clearances of the filter elements is immaterial.

As filter elements 9 contract, e.g., as they cool, centering plate 12 lowers of its own weight. Centering place 12 is therefore preferably made of a heavier material such as stainless steel. In a further advantageous embodiment of the invention, centering plate 12 has peripheral recesses and/or perforations. This results in the unhindered circulation of the fluids to be filtered on both sides of the centering plate. Such recesses and perforations also alleviate fluid pressure on centering plate 12 and so counteract the tendency of the centering plate to be dislodged, which can occur during strong surges in the filtration process. For multiple filter housings with more than two filter elements, it is particularly advantageous to design the openings of the centering plate to accept the guide adapters 10 as oblong holes on the periphery of the centering plate as shown, for example, as element 24 in FIG. 2, as such a design facilitates the attachment and locking of the centering plate along the axis of symmetry of the locking opening 18. Incorporation of such perforations on the periphery of the centering plate permits the perforation's outermost edge that coincides with the circular arc of the centering plate to serve as additional support of the centering plate on the inner wall of the attached housing dome 5.

As mentioned, another advantageous embodiment of the invention is obtained if centering plate 12 is formed so that it is symmetric about the axis of symmetry of the circular aperture 22. This allows even unskilled personnel to securely install the centering plate of the locking device. An essential advantage of the invention is that filter elements of different sizes can be used and secured within one and the same multiple filter housing. For example, in a multiple filter housing wherein the housing is designed for operation with 30-inch filter elements the operation and locking of 20-inch and even 10-inch filter elements is also possible. Similarly, in a multiple filter housing designed for operation with 20-inch filter elements, the operation and locking of 20-inch and even 10-inch filter elements is possible. If several model sizes of filter elements are used simultaneously, a number of centering plates may be used that correspond to the different model sizes, the size of their filter element/guide adapter openings or their shape varied in such a way that each respective centering plate can be lowered to the locking height of each respective smaller size of the filter elements, while the last centering plate can be lowered to the locking height of the largest size filter. Multiple filter housings with a very large number of filter elements may be equipped with several spacer rods. A number of openings corresponding to the number of spacer rods are then made in the centering plate; in such instances it will suffice if only one of the spacer rods is equipped with the locking profile(s). It is, however, also possible to provide a customized centering plate for each spacer rod.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A fluid filter apparatus having at least one locking device for multiple filter elements (9), equipped with connections for supply (3) and discharge (4) of fluids and comprising at least one housing dome (5), at least one housing base (2) and at least one base plate (8) supporting said at least one locking device, wherein said at least one locking device comprises at least one centering plate (12) and a spacer rod (11) attached perpendicularly and rigidly to an element selected from said housing base (2) and said base plate (8), said base plate (8) accommodating multiple filter elements (9) which have guide adapters (10) on their ends distal to said base plate (8) characterized in that said at least one centering plate (12) has a locking opening (18) and multiple openings (19, 20, 21) to accommodate said multiple filter elements (9) and said spacer rod (11) is provided with at least one locking segment (15) capable of engaging said locking opening (18) in a locking relationship while permitting said centering plate (12) to move axially along said spacer rod (11), yet permits said centering plate (12) to be movable both radially around and axially along said spacer rod (11) when said centering plate (12) and said spacer rod (11) are not in a locking relationship.

2. Apparatus of claim 1 wherein said at least one locking segment is located at a height on said spacer rod corresponding to a point falling within the upper half of said at least one filter element.

3. Apparatus of claim 1 wherein said at least one locking segment is located at a height on said spacer rod corresponding to a point falling within the upper third of said at least one filter element.

4. Apparatus of claim 1 wherein said at least one locking segment is located at a height on said spacer rod corresponding to the height of said guide adapters.

5. Apparatus of any of claims 1 to 4 wherein said locking opening is in the shape of a keyhole having a circular portion and a rectangular portion.

6. Apparatus of claim 5 wherein the center of the rectangular portion of said keyhole shape coincides with the center of a circle that is smaller than the circumference of said housing dome.

7. Apparatus of claim 6 wherein said centering plate is provided in its periphery with fluid circulation enhancers selected from recesses and perforations.

8. Apparatus of claim 7 comprising multiple centering plates and multiple spacer rods.

9. Apparatus of claim 7 comprising filter elements of different sizes.

10. Apparatus of claim 9 wherein said different sizes are selected from 10 inches, 20 inches and 30 inches.

* * * * *

UNITED STATES PATENT AND TRADEMARK OFFICE
CERTIFICATE OF CORRECTION

| | | |
|---|---|---|
| PATENT NO. | : 6,372,133 B1 | Page 1 of 1 |
| APPLICATION NO. | : 09/675575 | |
| DATED | : April 16, 2002 | |
| INVENTOR(S) | : von der Hardt et al. | |

It is certified that error appears in the above-identified patent and that said Letters Patent is hereby corrected as shown below:

<u>Column 4,</u>
Line 27, change "place" to -- plate --.

Signed and Sealed this

Twentieth Day of June, 2006

JON W. DUDAS
*Director of the United States Patent and Trademark Office*